United States Patent
Pineau et al.

(10) Patent No.: US 10,682,891 B2
(45) Date of Patent: Jun. 16, 2020

(54) EXTENDED-MOBILITY CROSS-PLY OR RADIAL TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (FR)

(72) Inventors: Jacky Pineau, Clermont-Ferrand (FR); Hervé Ferigo, Clermont-Ferrand (FR); José Merino Lopez, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 519 days.

(21) Appl. No.: 15/531,657

(22) PCT Filed: Dec. 1, 2015

(86) PCT No.: PCT/EP2015/078196
§ 371 (c)(1),
(2) Date: May 30, 2017

(87) PCT Pub. No.: WO2016/087437
PCT Pub. Date: Jun. 9, 2016

(65) Prior Publication Data
US 2017/0355232 A1    Dec. 14, 2017

(30) Foreign Application Priority Data

Dec. 3, 2014  (FR) ..................... 14 61838

(51) Int. Cl.
B60C 13/02 (2006.01)
B60C 19/12 (2006.01)
B60C 13/00 (2006.01)

(52) U.S. Cl.
CPC ............ B60C 13/02 (2013.01); B60C 13/002 (2013.01); B60C 19/122 (2013.01)

(58) Field of Classification Search
CPC ....... B60C 13/00; B60C 13/01; B60C 13/002; B60C 13/003; B60C 13/02; B60C 13/023
See application file for complete search history.

(56) References Cited

U.S. PATENT DOCUMENTS 1,304,177 A    5/1919  Greenberg
2,905,220 A *  9/1959  Schutz .................. B60C 19/122
                                                152/504
(Continued)

FOREIGN PATENT DOCUMENTS

CN    101772430    7/2010
DE    864 064     1/1953
(Continued)

OTHER PUBLICATIONS

Machine translation of JP 53109306, 1978.*
Office Action dated Feb. 5, 2018 which issued in the corresponding Chinese Patent Application No. 2015800657336.

*Primary Examiner* — Justin R Fischer
(74) *Attorney, Agent, or Firm* — Cozen O'Connor

(57) ABSTRACT

Tire with sidewalls (6) having, on their outer surfaces, a set of protuberances (8) that alternate with voids (9). The tread (4) comprises a circumferential groove (10) at at least one axially outermost end (4a). Each protuberance (8) is disposed at the surface of a sidewall, the different protuberances being disposed regularly or irregularly and continuously or discontinuously between a point A and a point E. The inner wall (2a) of the carcass ply (2) of the tire is (Continued)

partially or entirely covered with at least one layer of a self-sealing composition (2*b*).

18 Claims, 6 Drawing Sheets

(56) References Cited

U.S. PATENT DOCUMENTS

| | | | |
|---|---|---|---|
| 3,361,698 A | 1/1968 | Pace | |
| 3,628,585 A | 12/1971 | Pace | |
| 2010/0193102 A1 | 8/2010 | Tsuruta et al. | |
| 2011/0259499 A1 | 10/2011 | Kuo | |
| 2012/0291935 A1 | 11/2012 | Kuo | |

FOREIGN PATENT DOCUMENTS

| | | | |
|---|---|---|---|
| EP | 2088007 | * | 8/2009 |
| JP | 53109306 | * | 9/1978 |
| JP | 4689281 | * | 5/2011 |
| WO | WO 2014/207093 | | 12/2014 |
| WO | WO 2014/207094 | | 12/2014 |

\* cited by examiner

Section A-A

EXTENDED-MOBILITY CROSS-PLY OR RADIAL TIRE

RELATED APPLICATIONS

This is a U.S. National Phase Application under 35 USC 371 of International Application PCT/EP2015/078196 filed on Dec. 1, 2015.

This application claims the priority of French application no. 1461838 filed Dec. 3, 2014, the entire content of which is hereby incorporated by reference.

FIELD OF THE INVENTION

The invention relates to extended-mobility cross-ply or radial tires.

BACKGROUND OF THE INVENTION

Radial tires have gradually become established in various markets, notably the market for passenger vehicle tires. This success is due in particular to the endurance, comfort and low rolling resistance qualities that radial tires have to offer.

The main parts of a tire are the tread, the sidewalls and the beads. The beads are intended to come into contact with the rim. In a radial tire, each of the main parts of which the tire is made, namely the tread, the sidewalls and the beads, has functions that are clearly separated from one another, and therefore has a well-known specific makeup.

A radial tire is essentially reinforced by a carcass reinforcement comprising at least one carcass ply set at an angle substantially equal to 90° with respect to the circumferential direction of the tire. This carcass reinforcement is surmounted radially on the outside, and under the tread, by reinforcing plies that form a belt.

A cross-ply tire differs from a radial tire in that there are at least two crossed plies set at angles other than 90° with respect to the circumferential direction of the tire. The plies are said to be "crossed" because the angles are of opposite sign from one ply to the next.

For describing embodiments of the invention, the circumferential direction of the tire is defined as the direction in a plane perpendicular to the axis of rotation of the tire and tangential to the tire belt reinforcement.

Since the emergence of radial tires, certain cross-ply tires have also been provided with a belt reinforcement under the tread.

In both these types of tire, the tread, in direct contact with the ground, notably has the function of providing contact with the roadway and needs to adapt to the shape of the ground. The sidewalls for their part absorb the unevennesses of the ground by transmitting the mechanical forces required to support the load of the vehicle and allow it to move.

The belt reinforcement is a reinforcement which, on the one hand, needs to be sufficiently rigid with regard to edge deformations so that the tire can develop the cornering thrust necessary for steering, and transmit torque for traction or for braking and, on the other hand, be very soft in bending, that is to say allow variations in curvature in its plane in order to provide a sufficient area of contact of the tire with the ground.

As a result, the belt reinforcement generally has a composite structure allowing it to offer the required rigidity for a relatively low weight. The belt reinforcement is generally made up of at least two plies set at different angles, comprising reinforcers in the form of cords, coated with rubber. The reinforcer elements are crossed from one ply to the other with respect to the circumferential direction and may or may not be symmetrical with respect to this direction.

The following definitions are used here:
"longitudinal or circumferential direction" is the direction of running of the tire,
"radial direction" is a direction that intersects the axis of rotation of the tire and is perpendicular thereto,
"axial direction" is a direction parallel to the axis of rotation of the tire,
"radially on the inside of" means closer to the axis of rotation,
"radially on the outside of" means further from the axis of rotation,
"equatorial plane or midplane" means a plane perpendicular to the axis of rotation of the tire and which divides the tire into two substantially equal halves,
"transverse direction of the tire" means a direction parallel to the axis of rotation,
"radial or meridian plane" means a plane which contains the axis of rotation of the tire.

When the wall of a tire is holed by a puncturing object such as a screw or a nail, or "punctured", tire inflation air may escape through the puncture and the resultant loss in pressure may cause the tire to flatten and the vehicle to stop.

In order to address this problem of punctures, which dates right back to the very start of the use of wheels fitted with pneumatic tires, the usual solution is to stop and replace the affected wheel with a spare wheel.

Other solutions have been conceived of and are available on the market in order to avoid having to use a spare wheel.

Document U.S. Pat. No. 5,916,921 presents an aerosol container containing an aqueous latex emulsion mixed with various products including fibrous products and a propellant gas. If the tire flattens, this container is designed to be fixed to the tire valve and expel the propellant gas and the sealing/repair emulsion into the internal cavity of the tire. The tire is then reinflated, at least partially, the emulsion plugs the puncture and running can be resumed, at a low speed initially in order to distribute the emulsion properly over the entire internal surface of the tire, and then normally.

There are also repair kits, which are offered by certain motor manufacturers in place of a spare wheel. The benefit of that is that it reduces the weight of the car and therefore the fuel consumption thereof and saves space under the floor of the luggage compartment.

Tire repair kits and aerosol cans are only temporary repairs. It is appropriate not to exceed a given speed of around 80 km/h and to have the tire checked or changed quickly.

Tire manufacturers have also proposed tires that are provided on their inner wall or within their structure with a layer of elastic, viscous or pasty products referred to as "self-sealing products", that are able to seal punctures.

However, the application of these self-sealing products makes it possible to reinforce only the crown region of the tire against punctures. Specifically, these self-sealing products are not applied to the internal surface of the sidewalls because, during running, the centrifugal force which is exerted on the tire does not allow the self-sealing product to remain in its initial location.

Another anti-puncture solution would consist in increasing the thickness of the sidewalls. However, this would cause an increase in mass and have a negative impact on the rolling resistance of the tire.

SUMMARY OF THE INVENTION

One object of the invention is to stiffen the sidewalls of a tire coated with a self-sealing composition in order in this way to reduce the flexural movements of the sidewalls and consequently to avoid a situation in which the sidewalls come into contact with the radial interior of the crown region which is then coated with the self-sealing product, the adhesive capacity of which is particularly high.

This and other objects are attained in accordance with one aspect of the invention directed to a tire for a rolling assembly comprising a rim and a tire, said tire having at least one carcass reinforcement that comprises an inner wall and is surmounted radially on the outside by a crown reinforcement, itself radially on the inside of a tread having two axially outermost ends, said crown reinforcement being made up of at least one layer of reinforcing elements, said tread being connected to two beads by way of two sidewalls, said beads being intended to come into contact with a rim having rim flange tops, each bead having at least one circumferential reinforcing element, said sidewalls having, on their outer surfaces, a set of protuberances that alternate with voids, the inner wall of the carcass ply of the tire being partially or entirely covered with at least one layer of a self-sealing composition.

Each protuberance is disposed at the surface of a sidewall, the different protuberances being disposed continuously between a point A and a point E, said point A being disposed at the intersection of the radially outer surface of the tread and of the sidewall, with a radial axis ZZ' at a distance from a plane AA' by a length $L_A$ of between ½(L-60 mm) and ½(L-10 mm), L being the nominal section width, said plane AA' being parallel to the equatorial plane and tangential to the sidewall, and said point E being disposed, as desired, in a radius such that $R_2<E<(R_A-15$ mm), $R_2$ being the radius at the rim flange top and $R_A$ being the radius at the point A, and the inner wall of the carcass ply of the tire is partially or entirely covered with at least one layer of a self-sealing composition.

Preferably, the tread comprises a circumferential groove at at least one axially outermost end.

Preferably, at least one protuberance partially or entirely interrupts or does not interrupt said circumferential groove.

The expression "does not interrupt" means that the radially upper end of a protuberance is either adjacent to the circumferential groove or at a distance "d" of between 2 and 10 mm therefrom substantially in a radial direction.

The expression "partially interrupts" means that the radially upper end of a protuberance partially intersects the circumferential groove.

The expression "entirely interrupts" means that the radially upper end of a protuberance meets the axially outer end of the tread that is closest to it.

When the protuberance partially interrupts the groove, this interruption takes place over between 2 and 97% of the total axial separation of said groove, preferably between 20 and 80% and more preferably between 30 and 50%.

The groove is a region of given width that is situated around the point A and has a longitudinal void ratio of greater than 70%.

The term "regular" defines the fact that the protuberances disposed between the points A and E are disposed next to one another in a radial direction, possibly with symmetry, and uniformly.

The term "irregular" defines the fact that the protuberances disposed between the points A and E are disposed with an offset in two radial and parallel directions without symmetry and non-uniformly.

The radius $R_A$ is a function of the length $L_A$, itself a function of the length L.

$R_1$ may be in the range between $(0.8R_2+0.2R_A)$ and $(0.2R_2+0.8R_A)$.

The nominal section width L is defined as being the section width of a tire mounted on a rim and inflated; the section width being, according to the invention, the distance between the outside of the sidewalls of an inflated tire, incorporating the sidewall surface relief. $R_1$ corresponds to the radius at the point situated on the outer surface of the sidewall furthest away from the midplane.

The tire according to the invention has the advantage of being quick and easy to produce and of making it easily possible to stiffen the sidewalls.

The tire according to the invention has the advantage of affording overall performance, such as rolling resistance, wear, endurance, that is similar to that of conventional tires.

Another aspect of the invention is directed to a mounted assembly comprising a rim and the tire as described above.

Preferably, the self-sealing composition has a Shore 00 hardness of less than or equal to 10, preferably less than or equal to 5, and more preferably equal to zero.

Preferably, the self-sealing composition is chosen from a composition based on a thermoplastic stirene (TPS) elastomer, or from a composition comprising at least one unsaturated diene elastomer, or from terpene and polybutene resins as main component, or from silicone-based, urethane-based, stirene-based or ethylene-based compounds, or from a composition based on a butyl elastomer.

Preferably, the composition based on a thermoplastic stirene (TPS) elastomer comprises more than 200 phr of an extender oil for extending said elastomer.

Preferably, the composition comprising at least one unsaturated diene elastomer comprises between 30 and 90 phr of a hydrocarbon resin, a liquid plasticizer of which the glass transition temperature (Tg) is below −20° C., at a weight content of between 0 and 60 phr and from 0 to 120 phr of a filler.

The composition based on a butyl elastomer may comprise a non-halogenated butyl elastomer.

Preferably, the composition based on a butyl elastomer comprises between 5 and 40 phr of an extender oil, such as polyisobutylene, between 5 and 55 phr of a tackifying resin, and a non-reinforcing filler. The polyisobutylene preferably has a molecular weight less than or equal to 10 000, and preferably less than or equal to 5000. The non-reinforcing filler is preferably chosen from chalk or kaolin.

Preferably, at least one protuberance has a height and a length, said height being at a minimum at the section width and increasing progressively on either side of said section width with a minimum height at a distance of between $0.9R_1$ and $1.1R_1$.

Preferably, at least two protuberances have different lengths from one another.

Preferably, each protuberance has an average height of between 3 and 10 mm.

Preferably, each protuberance has an average width of between 4 and 12 mm.

The average height of each protuberance may be between 5 and 8 mm. The protuberances may have an average height greater than 80% of the maximum height over at least 80% of the distance between the points A and E. The average height is defined as the average of the height between the ends of a protuberance.

The protuberances preferably have a relief angle α less than or equal to 20°, and preferably between 5 and 8°.

Two adjacent protuberances may be spaced apart from one another by an average distance less than or equal to 2 times the average width of a protuberance, and may be substantially parallel to one another.

The protuberances preferably cover at least 40% of the overall circumferential surface of the sidewall between the points A and E.

Each protuberance, of defined or arbitrary geometric shape, may comprise a neutral fibre that passes through a radially innermost end and through a radially outermost end and is set at an angle β, with respect to the radial direction ZZ', of between −60° and +60°.

The outboard sidewall of the tire (which is the one on the outside when mounted on the vehicle) and the inboard sidewall of the tire (which is the one on the inside when mounted on the vehicle) may each comprise protuberances with any possible combination of inclinations.

Likewise, the four tires of a vehicle may have inclinations that are variable according to each axle and/or on one and the same axle.

Preferably, the void between two adjacent protuberances extends axially in the continuation of the void of a circumferential groove of the tread, passing through the point A, said groove being disposed at at least one axial end of the tread.

Preferably, the void between two adjacent protuberances is set at an angle to the circumferential direction of between −15° and +15° in a sidewall region close to the point A, that is to say situated between 3 and 8 mm.

Preferably, in a defined radial plane, whatever this plane situated between the points A and E may be, the sum of the widths, which may be variable, of each protuberance in the circumferential direction is greater than or equal to 60% of the total circumferential length, said length being measured at the location of the protuberances.

The tire according to an embodiment of the invention may have a [sum of the total widths of each protuberance]/$2\pi R$ ratio greater than or equal to 30%, and more preferably equal to 60%, the widths of each protuberance being defined at 50% of the total height of said protuberance, the radius R being an average radius.

The protuberance may be present along the entire circumferential length of the sidewall of the tire.

The protuberances present on the sidewalls according to an embodiment of the invention are made of a material identical to that of the sidewalls.

BRIEF DESCRIPTION OF THE DRAWINGS

The invention will now be described with the aid of examples and drawings which follow and which are given purely by way of illustration, and in which.

DETAILED DESCRIPTION OF THE DRAWINGS

In the various figures, identical or similar technical elements have been given the same reference numbers. In order not to overburden the text, their descriptions are not repeated.

Figure 1:
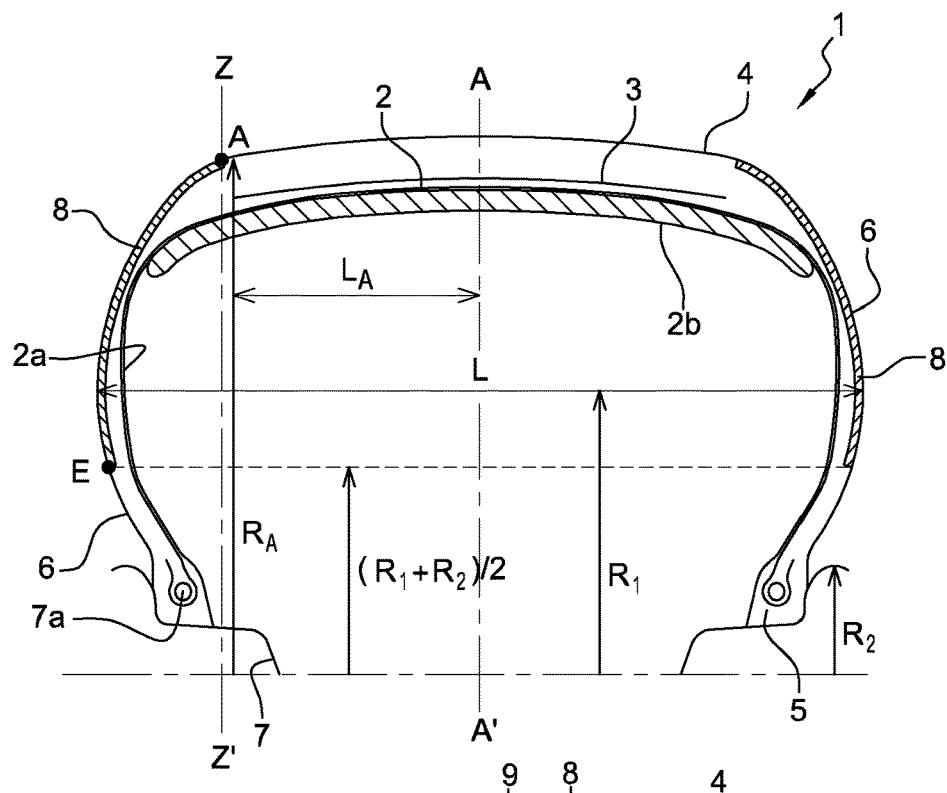
FIG. 1 schematically shows the cross section of a tire according to an embodiment of the invention in a radial plane comprising a continuous protuberance.

As FIG. 1 shows, the passenger-vehicle tire of general reference 1 comprises a carcass reinforcement 2, comprising an inner wall 2a, covered with a layer of self-sealing composition 2b, radially on the inside of a belt reinforcement of overall reference 3, said belt reinforcement 3 being radially on the inside of a tread 4 itself connected to two beads 5 by way of two sidewalls 6. The beads 5 are intended to come into contact with a rim 7 (shown in part). Each bead comprises at least one circumferential reinforcing element 7a. On their surfaces, the sidewalls have a series of protuberances 8 that regularly alternate with voids 9 (shown in FIG. 2).

FIG. 1 shows a protuberance 8 in cross section, having a continuous neutral fibre. It will be recalled here that a neutral fibre is the name given to a neutral axis that passes substantially through the centre of the volume of each protuberance and which neither shortens nor lengthens when it is subjected to compression and/or depression.

As FIG. 1 shows, the protuberances 8 are disposed, at the surface of the sidewall, along a continuous length of neutral fibre that extends from a point A to a point E.

The point E is disposed at a radius less than $(0.75R_1 + 0.25R_2)$. $R_1$ is the radius at the nominal section width L, and $R_A$ is the radius at the point A.

The point E is disposed at a radius of 232 mm for a tire of reference 205/55 R 16 mounted on a 6.5 J 16 rim for which $R_A$ is equal to 298 mm, $R_2$ is equal to 220 mm and $R_1$ is equal to 261 mm.

The definition of section width according to the invention is suitable for any type of casing combined with any type of rim.

The point A is disposed at the intersection of the radially outer surface of the tread and of the sidewall, with an axis ZZ' at a distance from the equatorial plane AA' by a length $L_A$ equal to ½(L−45 mm). For a tire of reference 205/55 R 16, $R_A$ is equal to 298 mm. The plane AA' is parallel to the equatorial plane and tangential to the surface of the sidewall.

The protuberances are not inserted rubber elements added into the rubber of the sidewalls but are moulded in during the curing stage. They are obtained in a similar way to the tread patterns produced on the tread.

Figure 2A:
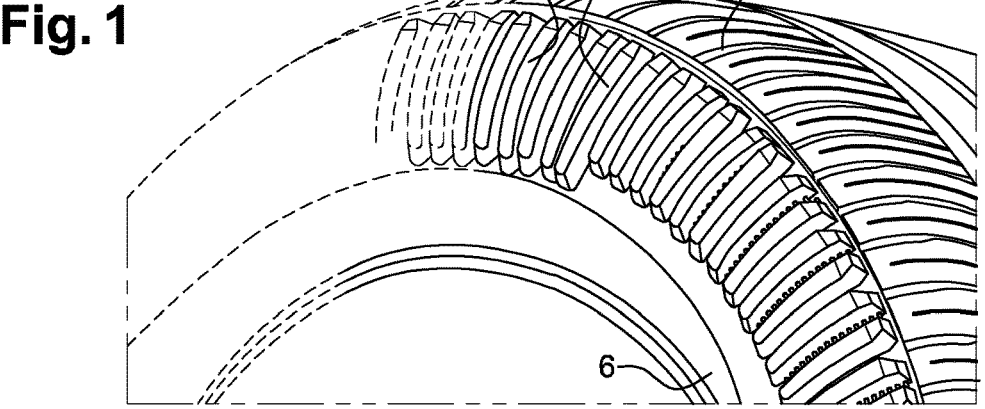
FIGS. 2A and 2B are three-dimensional schematic depictions of a portion of a sidewall and of the corresponding tread of a tire according to an embodiment of the invention, FIG. 3 schematically shows an enlarged portion of a sidewall comprising continuous protuberances of a tire according to an embodiment of the invention.
Figure 2B:
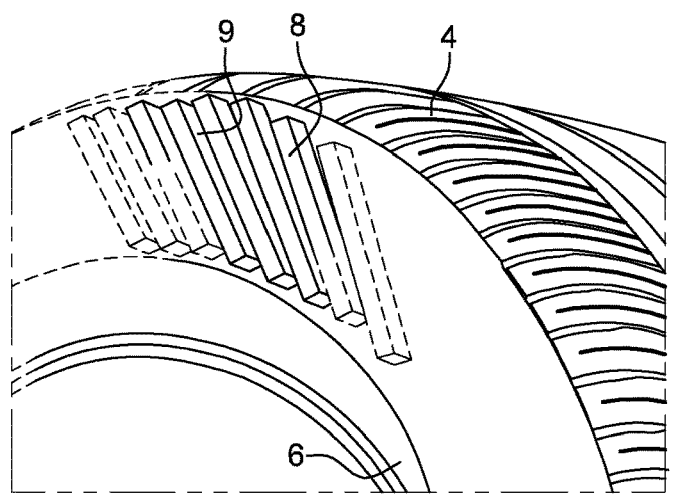
Figure 3:
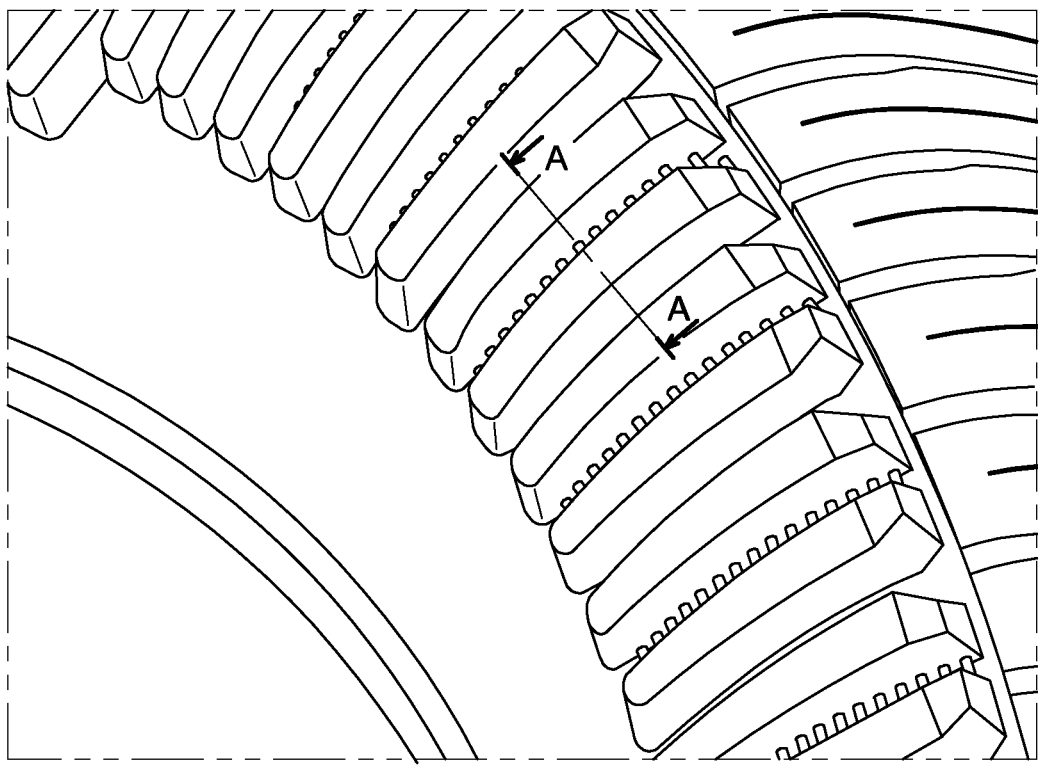
Figure 4:
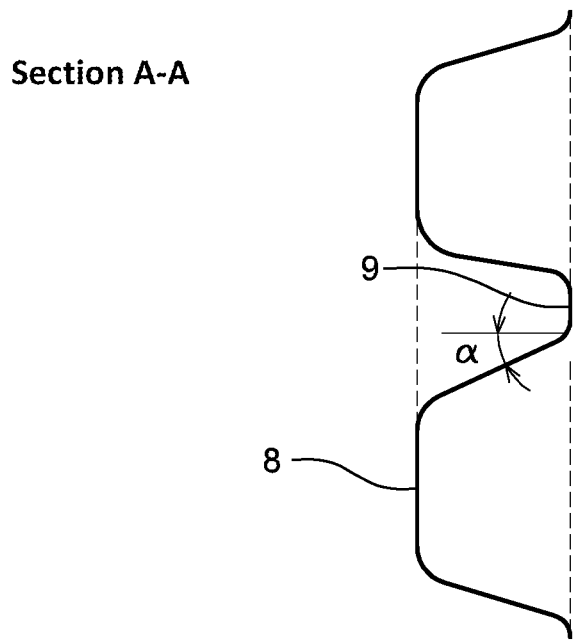
FIG. 4 shows a view in section on the line AA in FIG. 3 of two adjacent protuberances of a tire according to an embodiment of the invention.

FIG. 2A shows an alternation of protuberances 8 and of voids 9, represented in enlarged manner in FIGS. 3 and 4. FIG. 2B shows a variant of FIG. 2A in which the protuberances are set at an angle with respect to the axial direction. In this embodiment, the longest continuous protuberances 8 have a neutral-fibre length of around 75 mm for a tire of size 205/55 R 16. They are disposed radially (FIG. 2) in a manner substantially parallel and next to one another and are spaced apart by around 4.50 mm, have a height of around 6 mm and a width of around 8.6 mm in their axially innermost part.

The relief angle α is around 8°. Such a relief angle value allows the tire to be demoulded after curing without damage to the final structure.

According to this embodiment, the protuberances have a [sum of the widths of each protuberance]/2πR ratio equal to 30%, at mid-height and are set at no angle with respect to the radial plane.

Figure 5A:
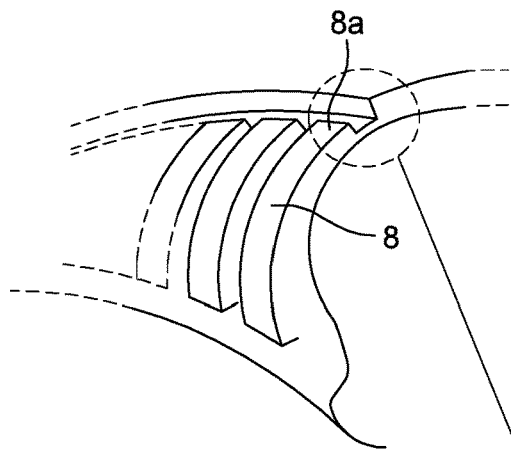
FIGS. 5A and 5B show, in a first variant, a portion of a radially outer part of a sidewall and the corresponding tread in three dimensions of a tire according to an embodiment of the invention.
Figure 5B:
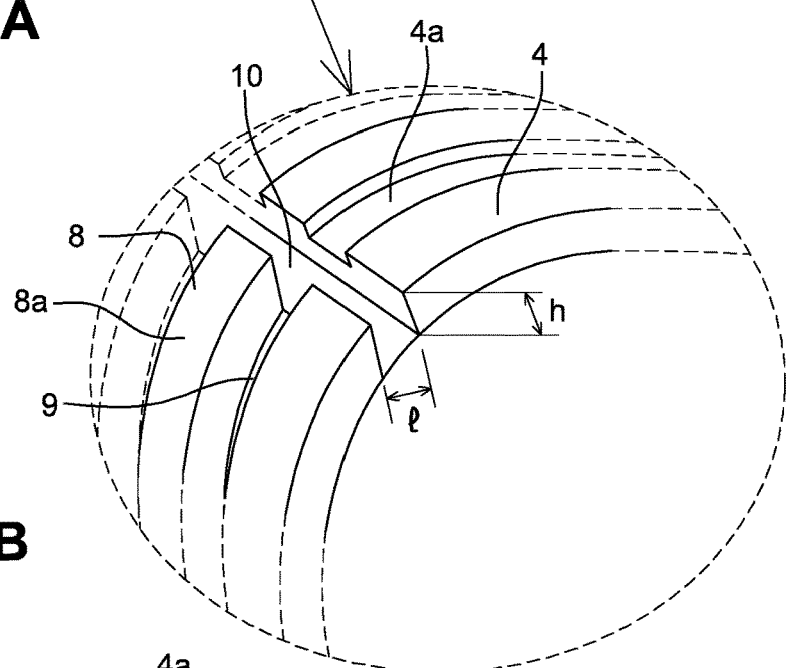

FIG. 5A shows a three-dimensional depiction of the radially outer part 8a of the protuberances 8 and FIG. 5B an enlargement thereof from FIG. 5A. In these FIGS. 5A and 5B, the part 8a of each protuberance 8 and the voids 9 are adjacent to a groove 10 disposed circumferentially on the surface of the tread 4 at the axially outermost end 4a thereof. The groove 10 is not interrupted in its length.

In this particular embodiment, the groove 10 has an axial width "l" along the axis YY' that may be between 2 and 10 mm and a radial height "h" along the axis ZZ' of between 3 and 8 mm.

Figure 6A:
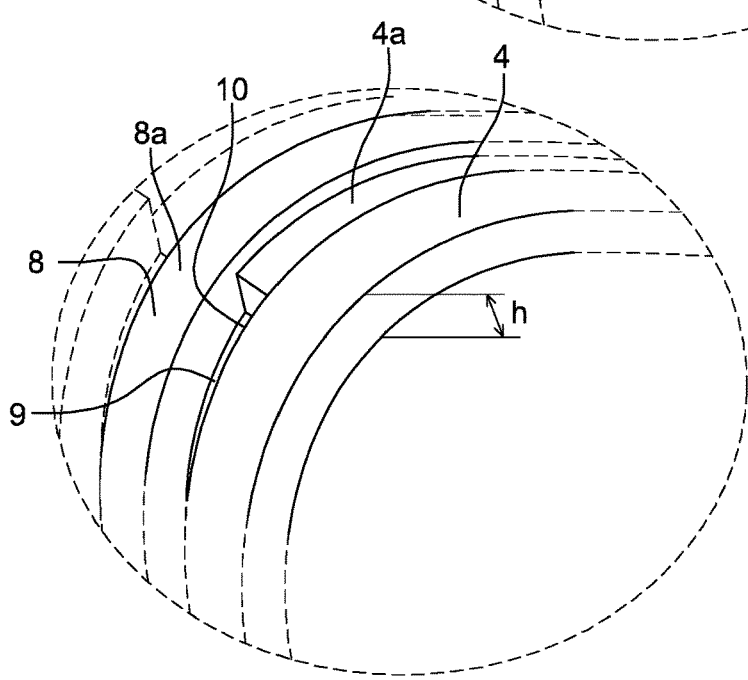
FIG. 6A shows, in a second variant, a portion of a radially outer part of a sidewall and of the corresponding tread in three dimensions, of which a certain protuberance completely interrupts a circumferential groove in a tire according to an embodiment of the invention.

FIG. 6A also shows a three-dimensional depiction of the radially outer part 8a of the protuberances 8. Unlike in FIGS. 5A and 5B, the groove 10 is interrupted. Specifically, the end 8a of the protuberances 8 and the adjacent voids 9 completely intersect the groove 10 in the circumferential direction of the tire.

Figure 6B:
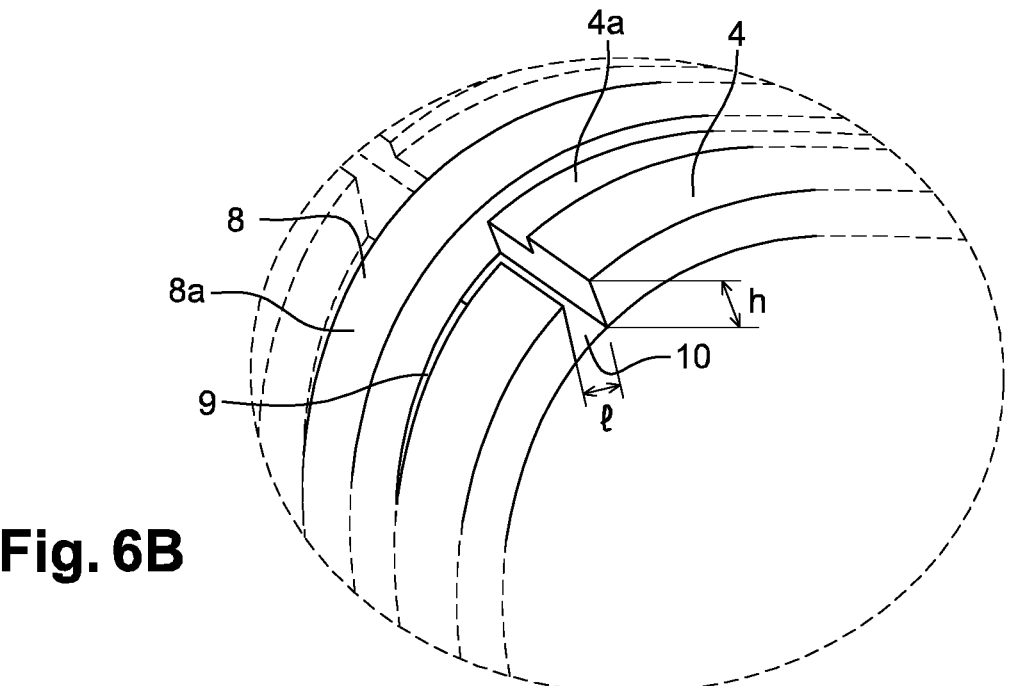
FIG. 6B shows, in another variant, a portion of a radially outer part of a sidewall and of the corresponding tread in three dimensions, of which a certain protuberance partially interrupts a circumferential groove in a tire according to an embodiment of the invention.

FIG. 6B shows another variant of a three-dimensional depiction of said radially outer part 8a of the protuberances 8. In this figure, the protuberance 8 partially intersects the groove 10 in the circumferential direction of the tire.

Figure 7A:
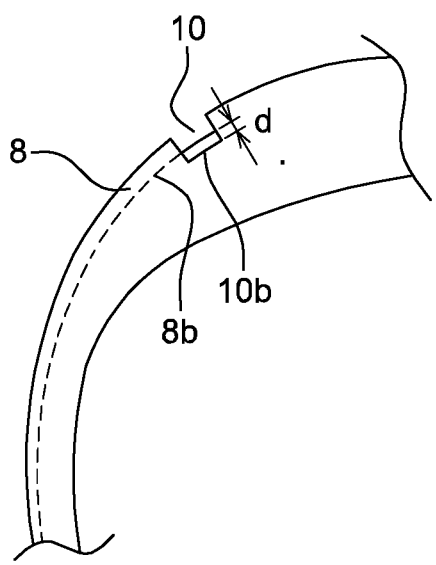
FIG. 7A shows a partial view in radial section of a part of a sidewall and of a part of the corresponding tread according to another variant.
Figure 7B:
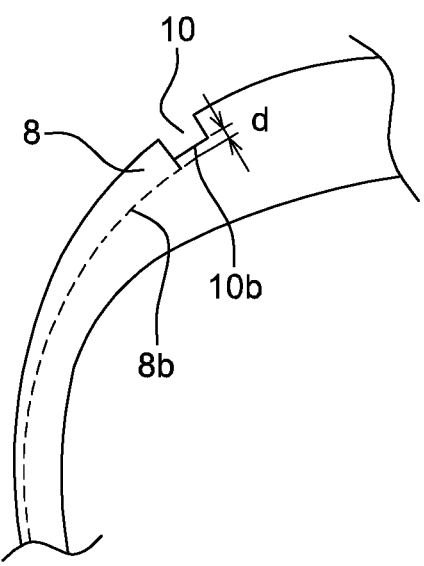
FIG. 7B shows a partial view in radial section of a part of a sidewall and of a part of the corresponding tread according to another variant of a tire according to an embodiment of the invention.

FIGS. 7A and 7B show that the radially inner portion 8b (shown by way of a dotted line) of the protuberance 8 is at a distance from the radially inner part 10b of the void 10 by a thickness "d". This thickness "d" is less than 2 mm and preferably less than 1 mm.

Figure 8:
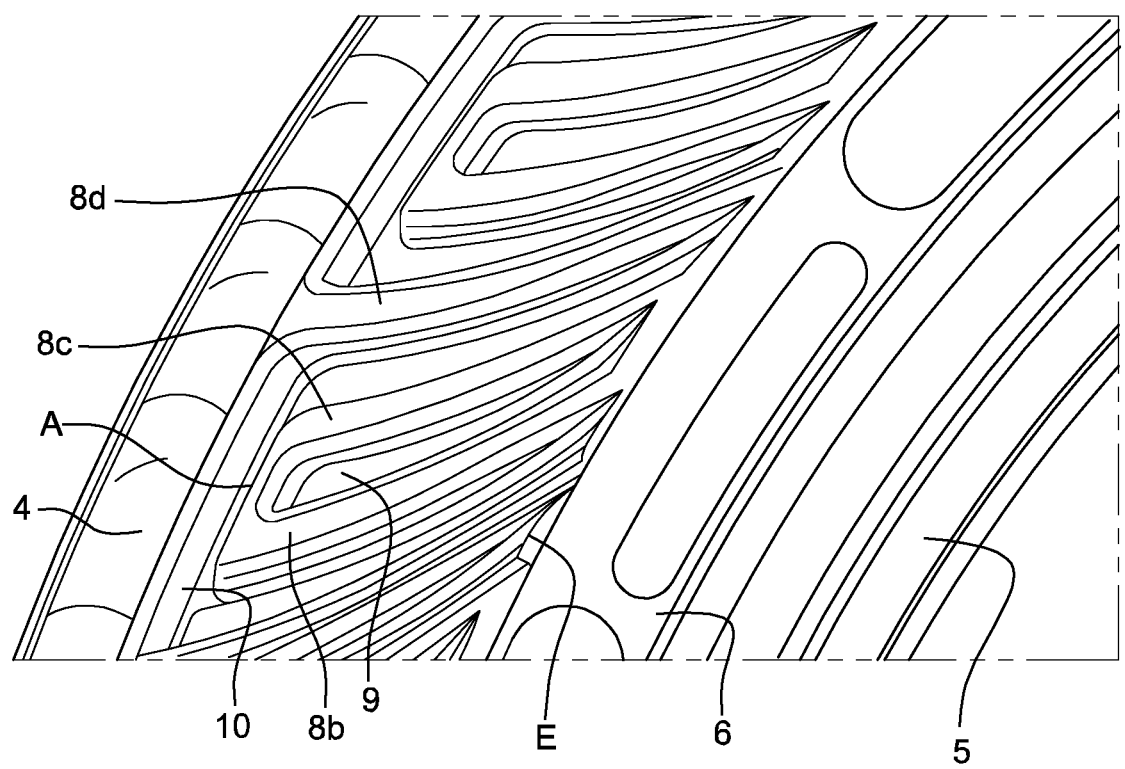
FIG. 8 is a three-dimensional schematic depiction of a portion of a sidewall and of the corresponding bead of a tire according to an embodiment of the invention, FIG. 9 schematically shows the cross section of a tire according to an embodiment of the invention in a radial plane comprising a discontinuous protuberance.

FIG. 8 shows that the radially upper end of the protuberances 8b and 8c is adjacent to the circumferential groove 10 and that the radially upper end of the protuberance 8d entirely interrupts the groove 10 to meet the blocks of elastomeric rubber of the tread 4. This figure thus shows an embodiment of a tire according to the invention in which each protuberance 8b, 8c alternates with a void 9. Each of the protuberances 8b, 8c extends from the point A to the point E.

Figure 9:
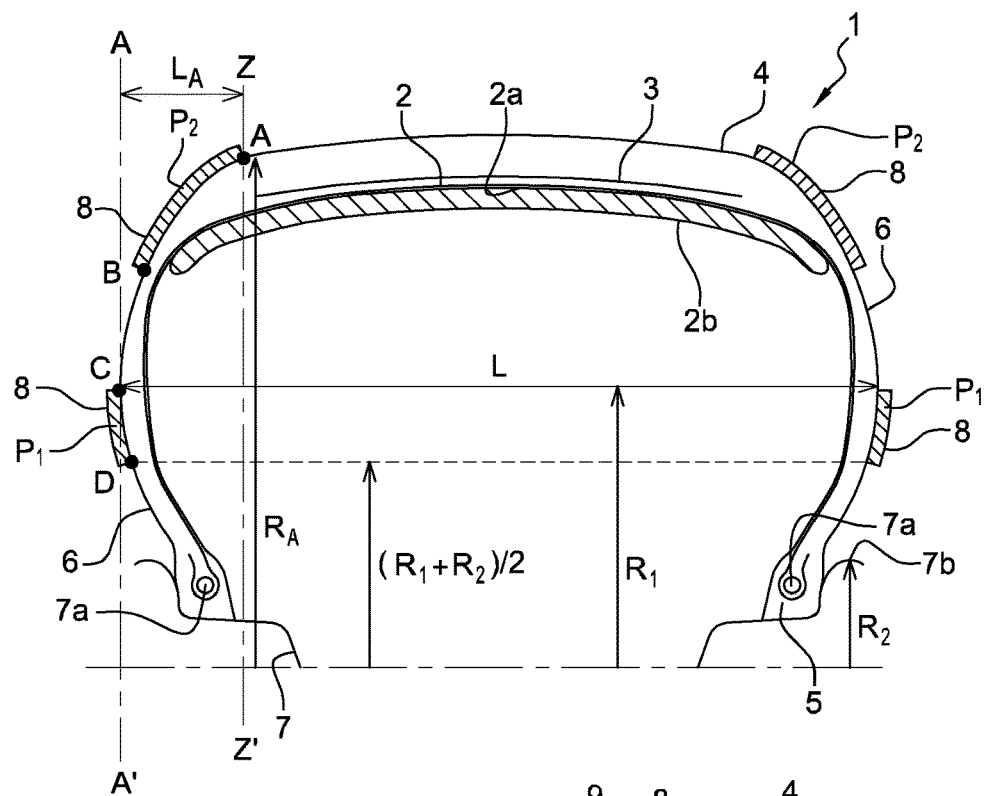

FIG. 9 shows a protuberance 8 in cross section, having a discontinuous neutral fibre length.

It will be recalled here that a neutral fibre is the name given to a neutral axis that passes substantially through the centre of the volume of each protuberance and which neither shortens nor lengthens.

The protuberances 8 are disposed, at the surface of the sidewall, along a discontinuous length of neutral fibre that extends from a point A to B and from a point C to D.

The point A is disposed at the intersection of the radially outer surface of the tread and of the sidewall, with an axis ZZ' at a distance from the equatorial plane by a length equal to 90 mm The point B is situated in a radius equal to 266 mm, the point C in a radius equal to 258 mm, and the point D in a radius equal to 238 mm for a tire of reference 205/5 R 16 mounted on a 6.5 J 16 rim.

The protuberances are not inserted rubber elements added into the rubber of the sidewalls but are moulded in during the curing stage. They are obtained in a similar way to the tread patterns produced on the tread. The inner wall 2a comprises a layer of self-sealing composition 2b.

Figure 10:
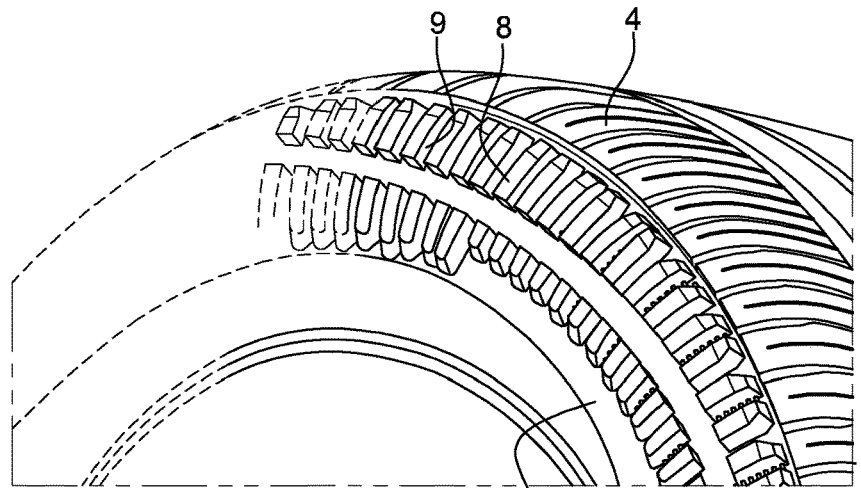
FIGS. 10 and 11 are three-dimensional schematic depictions of an enlarged portion of a sidewall and of the corresponding tread of a tire according to an embodiment of the invention and comprising a discontinuous protuberance.
Figure 11:
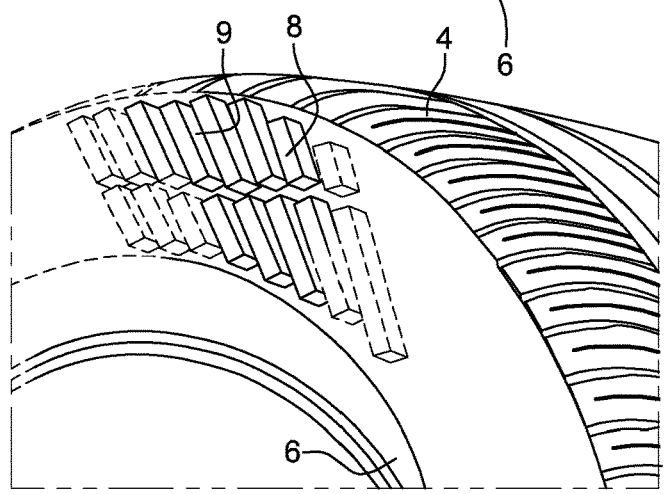

FIGS. 10 and 11 show an alternation of protuberances 8 and voids 9. FIG. 11 shows a variant of FIG. 10 in which the protuberances are set at an angle with respect to the axial direction. According to this embodiment, the protuberances 8 are discontinuous and have a discontinuous neutral fibre length of around 45 mm for the part P1 (between C and D) and of 40 mm for the part P2 (between A and B) for a tire of size 205/55 R 16. They are disposed in a manner substantially parallel and next to one another and are spaced apart by around 4.50 mm, have a height of around 6 mm and a width of around 8.6 mm in their axially innermost part.

The tire according to the invention is obtained after curing and moulding in a curing mould in the conventional way.

EXAMPLE 1

Kerbing Test

This test was carried out with a tire of reference 205/55 R16 comprising various styles of protuberance, against the same control tire without protuberances.

The tires P1 to P4 are various tires according to the invention.

The protuberances of tires P1 and P4 are set at no angle of inclination with respect to the radial direction.

The protuberances of tires P2 and P3 are set at an angle of inclination with respect to the radial direction.

The "Angle" column corresponds to the angle that each protuberance makes with the radial direction of the tire.

The relief angle α is the angle that each end of a protuberance makes, as shown in FIG. 4, intended to make same easier to demould.

The spacing of a protuberance is the distance between the centre of a first void and the centre of a second void adjacent to the first.

H (mm) is the average height of the protuberances, l (mm) is the average width of the protuberances.

$R_1$ is the radius at the nominal section width, $R_2$ is the radius at the top of the rim flange, $R_E$ is the radius corresponding to the point E and $R_A$ the radius at the point A.

The section width with the reliefs comprises the nominal section width and the height of the protuberances present on the surface of the sidewalls.

Table I below collates the measurable technical features of the various tires according to the invention.

TABLE I

| Tire | Control | P1 | P2 | P3 | P4 |
|---|---|---|---|---|---|
| Angle (degrees) | None | 0 | +60 | −60 | 0 |
| Protuberance relief angle (degrees) | — | 8 | 8 | 6 | 6 |
| Protuberance height H (mm) | — | 8 | 8 | 6 | 5 |
| Protuberance width l (mm) | — | 10 | 10 | 5 | 7 |
| Protuberance neutral fibre length (mm) | — | 53 | 75 | 75 | 55 |
| $R_1$ (mm) | 260 | 261 | 261 | 261 | 261 |
| $R_2$ (mm) | 220 | 220 | 220 | 220 | 220 |
| $R_E$ (mm) | — | 224.1 | 224.1 | 224.1 | 228 |
| $R_4$ (mm) | — | 298 | 298 | 298 | 298 |
| Section width with reliefs (mm) | 212 | 223 | 223 | 220 | 223 |
| Spacing (mm) | 0 | 15 | 15 | 7 | 14 |

This test was carried out under the following operating conditions.

The tire, mounted on a 6.5 J 16 rim and inflated to a pressure of 1.9 bar is fitted to the front right axle of a vehicle and supports a load of 350 kg.

The test consists in carrying out, at various speeds, a knock against a kerb referred to as a "kerbing" of the tire against a metal block 90 mm tall, at an angle of 30° to the block with respect to the direction of running of the tire.

This test is carried out with a control tire (without protuberances) and with various tires according to the invention that comprise protuberances that may or may not be set at an angle to the radial axis of the tire.

The results in table II below show the gain obtained in terms of speed between a control tire (result equal to 100) and the various tires according to the invention, mentioned above, before the tire is punctured.

TABLE II

| Tire | Gain in speed (%) |
|---|---|
| Control | 100 |
| P1 | 120 |
| P2 | 125 |
| P3 | 135 |
| P4 | 120 |

The results in table II clearly show that the tire according to the invention, whatever the embodiment, provides a marked increase in the speed with which the kerb can be hit before the tire is punctured.

EXAMPLE 2

Kerbing Test

This test was carried out with a tire of reference 245/40 R18 comprising various styles of protuberance, against the same control tire without protuberances.

The tires P1 to P4 are various tires according to the invention.

The various technical features mentioned for Example 1 are reproduced in Example 2.

Table III below collates the measurable technical features of the various tires according to a variant of the invention.

| Tire | Control | P1 | P2 |
|---|---|---|---|
| Angle (degrees) | None | 0 | +30 |
| Protuberance relief angle (degrees) | — | 8 | 8 |
| Protuberance height H (mm) | — | 6 | 6 |
| Protuberance width l (mm) | — | 6 | 6 |
| Protuberance neutral fibre length (mm) | — | 45 | 52 |
| $R_1$ (mm) | 277 | 277 | 277 |
| $R_2$ (mm) | 248 | 248 | 248 |
| $R_E$ (mm) | — | 272 | 272 |
| $R_4$ (mm) | — | 313 | 313 |
| Section width with reliefs (mm) | 249 | 249 | 249 |
| Spacing (mm) | 0 | 12 | 12 |

This test was carried out under the same operating conditions as those explained in Example 1 with an 8.5 J 18 rim and a tire inflated to a pressure of 2.3 bar, all mounted on the front right axle of a vehicle and supporting a load of 580 kg.

The results in table IV below show the gain obtained in terms of speed between a control tire (result equal to 100) and the various tires according to the invention, mentioned above, before the tire is punctured.

TABLE IV

| Tire | Gain in speed (%) |
|---|---|
| Control | 100 |
| P1 | 128 |
| P2 | 130 |

The results in table IV clearly show that the tire according to the invention, whatever the embodiment, provides a marked increase in the speed with which the kerb can be hit before the tire is punctured.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a rolling assembly comprising:
   a rim having rim flange tops; and
   a tire, said tire having:
   two beads configured to come into contact with the rim, each bead having at least one circumferential reinforcing element;
   a tread having two axially outermost ends and connected to the two beads by way of two sidewalls;
   at least one carcass reinforcement that comprises an inner wall;
   a crown reinforcement that surmounts the at least one carcass reinforcement radially on an outside, the crown reinforcement radially on an inside of the tread, said crown reinforcement comprising at least one layer of reinforcing elements;
   a set of protuberances that alternate with voids arranged on respective outer surfaces of the sidewalls; and at least one layer of a self-sealing composition partially or entirely covering the inner wall of the carcass ply of the tire,
   wherein each protuberance is disposed continuously between a point A and a point E,
   wherein at least one protuberance has a height and a length, the height being at a minimum at a section width and increasing progressively on either side of the section width, said point A being disposed at the intersection of a radially outer surface of the axially outermost ends of the tread and the sidewall, with a radial axis ZZ' at a distance from, and parallel to, a plane AA' by a length $L_A$ of between ½(L-60 mm) and ½(L-10 mm), L being a nominal section width, said plane AA' being one of:

parallel to the equatorial plane and tangential to the sidewall, and parallel to and arranged at the equatorial plane, and said point E being disposed, as desired, in a radius such that $R_2<E<(R_A-15$ mm$)$, $R_2$ being the radius at the rim flange top and $R_A$ being the radius at the point A, wherein the radial axis ZZ' is parallel to an equatorial plane and intersects with the point A.

2. The tire according to claim 1, wherein a minimum height occurs at a distance of between $0.9R_1$ and $1.1R_1$, wherein $R_1$ is a radius associated with a maximum section width.

3. The tire according to claim 1, wherein at least two protuberances have different lengths from one another.

4. The tire according to claim 1, wherein each said protuberance has an average height of between 3 and 10 mm.

5. The tire according to claim 1, wherein each said protuberance has an average width of between 4 and 12 mm.

6. The tire according to claim 4, wherein the average height of each said protuberance is between 5 and 8 mm.

7. The tire according to claim 1, wherein each said protuberance has an average height greater than 80% of a maximum height over at least 80% of the distance between the points A and E.

8. The tire according to claim 1 wherein each said protuberance has a relief angle α less than or equal to 20°.

9. The tire according to claim 1, wherein two adjacent said protuberances are spaced apart from one another by an average distance less than or equal to 2 times an average width of a protuberance.

10. The tire according to claim 1, wherein two adjacent said protuberances are substantially parallel to one another.

11. The tire according to claim 1, wherein said protuberances cover at least 40% of an overall circumferential surface of the sidewall between the points A and E.

12. The according to claim 1, wherein each said protuberance, of defined or arbitrary geometric shape, comprises a neutral fibre that passes through a radially innermost end and through a radially outermost end and is set at an angle β, with respect to the radial direction ZZ', of between −60° and +60°.

13. The tire according to claim 1, wherein the void between two adjacent said protuberances extends axially in the continuation of the void of a circumferential groove of the tread, passing through the point A, said groove being disposed at at least one axial end of the tread.

14. The tire according to claim 1, wherein two adjacent said protuberances form a void between one another, the wall of one said protuberance making an angle α with the circumferential direction of between −15° and +15° in a sidewall region close to the point A.

15. The tire according to claim 1, wherein a sum of the widths of the protuberances in the circumferential direction is greater than or equal to 60% of the total circumferential length.

16. The tire according to claim 1, wherein the tire has a

[sum of the total widths of each protuberance]/2πR ratio greater than or equal to 30%, the widths of each said protuberance being defined at 50% of the total height of said protuberance and the radius R of the tire being an average radius.

17. The tire according to claim 1, wherein each said protuberance has a relief angle α between 5 and 8°.

18. The tire according to claim 1, wherein the tire has a

[sum of the total widths of each protuberance]/2πR ratio greater than or equal to 60% and less than or equal to 70%, the widths of each said protuberance being defined at 50% of the total height of said protuberance and the radius R of the tire being an average radius.

* * * * *